(12) United States Patent
Mitani

(10) Patent No.: US 7,951,731 B2
(45) Date of Patent: May 31, 2011

(54) INORGANIC FIBER MAT, HOLDING SEALER, SOUND ABSORBER, AND METHOD FOR MANUFACTURING INORGANIC FIBER MAT

(75) Inventor: Kenichi Mitani, Ogaki (JP)

(73) Assignee: Ibiden Co., Ltd., Ogaki-shi (JP)

( * ) Notice: Subject to any disclaimer, the term of this patent is extended or adjusted under 35 U.S.C. 154(b) by 477 days.

(21) Appl. No.: 12/056,781

(22) Filed: Mar. 27, 2008

(65) Prior Publication Data

US 2009/0081455 A1 Mar. 26, 2009

(30) Foreign Application Priority Data

Sep. 26, 2007 (JP) ................................. 2007-248918

(51) Int. Cl.
- *B32B 5/26* (2006.01)
- *D04H 1/54* (2006.01)
- *D04H 3/14* (2006.01)
- *D02G 3/00* (2006.01)

(52) U.S. Cl. ......................... 442/391; 442/409; 428/365

(58) Field of Classification Search .................. 442/391, 442/409; 428/365

See application file for complete search history.

(56) References Cited

U.S. PATENT DOCUMENTS

| | | |
|---|---|---|
| 6,960,386 B2 | 11/2005 | Agata |
| 2003/0049180 A1 | 3/2003 | Fukushima |
| 2004/0022699 A1 | 2/2004 | Fukushima |
| 2004/0052694 A1 | 3/2004 | Nishikawa et al. |
| 2004/0234428 A1 | 11/2004 | Tanahashi et al. |
| 2006/0278323 A1 | 12/2006 | Eguchi |
| 2007/0207069 A1 | 9/2007 | Kariya et al. |
| 2007/0231222 A1 | 10/2007 | Okabe |
| 2007/0292318 A1 | 12/2007 | Andoh et al. |
| 2008/0044317 A1 | 2/2008 | Kariya et al. |
| 2008/0047638 A1 | 2/2008 | Sugino |
| 2008/0178566 A1 | 7/2008 | Okabe |
| 2008/0181831 A1 | 7/2008 | Okabe |
| 2008/0312071 A1 | 12/2008 | Nishikawa et al. |
| 2009/0049690 A1 | 2/2009 | Eguchi |
| 2009/0072498 A1 | 3/2009 | Tanahashi et al. |
| 2009/0075812 A1 | 3/2009 | Tanahashi et al. |
| 2009/0081442 A1 | 3/2009 | Tanahashi et al. |
| 2009/0081455 A1 | 3/2009 | Mitani |
| 2009/0208384 A1 | 8/2009 | Merry |

FOREIGN PATENT DOCUMENTS

| | | |
|---|---|---|
| JP | 2003-105658 | 4/2003 |
| JP | 2006-342774 | 12/2006 |
| KR | 10-2007-0086216 | 8/2007 |
| WO | WO 2006/055188 A1 * | 5/2006 |

\* cited by examiner

*Primary Examiner* — Norca L Torres-Velazquez

(74) *Attorney, Agent, or Firm* — Ditthavong Mori & Steiner, P.C.

(57) ABSTRACT

An inorganic fiber mat includes an inorganic fiber aggregated body which includes inorganic fibers. At least a part of the inorganic fibers located on a surface of the inorganic fiber aggregated body is fused to each other by heat.

14 Claims, 8 Drawing Sheets

INORGANIC FIBER MAT, HOLDING SEALER, SOUND ABSORBER, AND METHOD FOR MANUFACTURING INORGANIC FIBER MAT

CROSS-REFERENCE TO RELATED APPLICATIONS

The present application claims priority under 35 U.S.C. §119 to Japanese Patent Application No. 2007-248918, filed on Sep. 26, 2007, the contents of which are incorporated herein by reference in their entirety.

BACKGROUND OF THE INVENTION

1. Field of the Invention

The present invention relates to an inorganic fiber mat, a holding sealer, a sound absorber and a method for manufacturing an inorganic fiber mat.

2. Discussion of the Background

Conventionally, a catalyst converter has been used as an exhaust gas purifying apparatus that purifies exhaust gases discharged from an internal combustion engine. The catalyst converter generally includes a holding sealer interposed between a catalyst supporting carrier (exhaust gas treatment unit) on which a catalyst is supported and a metallic shell (casing) that accommodates the catalyst supporting carrier. As the holding sealer, an inorganic fiber mat is sometimes employed which is made of ceramic fibers such as alumina-silica-based ones and that is impregnated with an organic binder and molded into a mat shape having a predetermined thickness.

In the catalyst converter, the holding sealer serves for thermal insulation, prevents leakage of unpurified exhaust gases through between the shell and the catalyst supporting carrier, and also prevents damage caused by contact between the shell and the catalyst supporting carrier.

Here, inorganic fibers that form the holding sealer (inorganic fiber mat) are fine fibers. Therefore, in assembling the catalyst converter, fibers may scatter away from a surface of the holding sealer to undesirably worsen working conditions.

In this respect, JP-A 2003-105658 discloses that, in an alumina fiber aggregate, scattering of alumina short fibers can be suppressed by controlling an average fiber diameter and a minimum fiber diameter to a specific range.

JP-A 2006-342774 discloses that the alumina fiber aggregate disclosed in Patent Document 1 is used as the holding sealer to thereby suppress an amount of scattering of inorganic fibers caused in assembling a catalyst converter. In addition, JP-A 2006-342774 discloses scattering of inorganic fibers can be suppressed also by increasing an amount of organic binder contained the holding sealer.

The contents of JP-A 2003-105658 and JP-A 2006-342774 are incorporated herein by reference in their entirety.

SUMMARY OF THE INVENTION

According to one aspect of the present invention, an inorganic fiber mat includes an inorganic fiber aggregated body which includes inorganic fibers. At least a part of the inorganic fibers located on a surface of the inorganic fiber aggregated body is fused to each other by heat.

According to another aspect of the present invention, an inorganic fiber mat includes an inorganic fiber aggregated body. The inorganic fiber aggregated body includes inorganic fibers; a rounded melted portion formed on at least a part of a surface of the inorganic fiber aggregated body; and at least a part of the inorganic fibers exposed on the surface being cross-linked by the melted portion.

According to the other aspect of the present invention, a holding sealer includes the inorganic fiber mat according to claim 1, the inorganic fiber mat being configured to be disposed between an exhaust gas treatment unit and a casing of an exhaust gas purifying apparatus.

According to the other aspect of the present invention, a sound absorber of a vehicle muffler includes an inorganic fiber mat includes an inorganic fiber aggregated body which includes inorganic fibers. At least a part of the inorganic fibers located on a surface of the inorganic fiber aggregated body is fused to each other by heat.

According to further aspect of the present invention, a method for manufacturing an inorganic fiber mat includes cutting an inorganic fiber aggregated body; and heat-treating at least a part of a surface of the inorganic fiber aggregated body.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
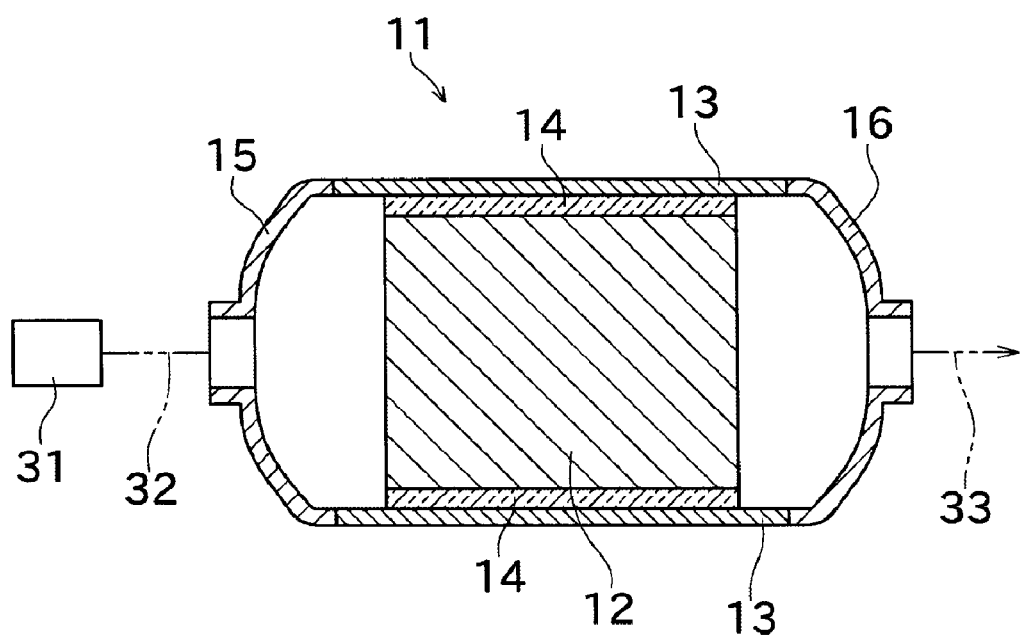
FIG. 1 is a schematic sectional view of a catalyst converter including a holding sealer according to an embodiment of the present invention.

The embodiments will now be described with reference to the accompanying drawings, wherein like reference numerals designate corresponding or identical elements throughout the various drawings.

According to a first aspect in accordance with an embodiment of the present invention, there is provided an inorganic fiber mat formed by cutting an inorganic fiber aggregated body, wherein inorganic fibers existing on at least a part of a surface of the inorganic fiber aggregated body are heat-treated and fused to one another.

In the first aspect, at least a part of the surface of the inorganic fiber mat is heat-treated, following which fibers existing on the surface are melted and fused to other fibers; therefore, the fibers are less likely to scatter. Thus, scattering of fibers away from the inorganic fiber mat is more likely to be effectively reduced. In addition, by heating the surface, end portions of fibers exposed on the surface are melted and changed into rounded shapes. Accordingly, a sense of irritation and a feeling of discomfort, which may arise when the surface is touched with a hand, may be reduced more easily. Moreover, since scattering of fibers tends to be reduced well without increasing an amount of organic binder, the inorganic fiber mat can be easily adapted to needs for a less amount of organic binder.

In the above-mentioned inorganic fiber mat, a crystallization rate of the heat-treated surface is preferably about 80% or less.

This tends to more favorably reduce scattering of fibers away from the heat-treated surface.

According to a second aspect in accordance with an embodiment of the present invention, there is provided an inorganic fiber mat formed by cutting an inorganic fiber aggregated body, wherein a rounded melted portion is formed on at least a part of a surface of the inorganic fiber aggregated body, and at least a part of fibers exposed on the surface is cross-linked by the melted portion.

In the second aspect, the fibers exposed on the surface are more likely to be cross-linked together by the rounded melted portion. Accordingly, scattering of fibers away from the surface tends to be suppressed well, and in addition a sense of irritation and a feeling of discomfort caused when the surface is touched with a hand may be reduced more easily.

In the above-mentioned inorganic fiber mat, the inorganic fiber aggregated body is preferably cut by a laser.

Since this tends to enable cutting of the inorganic fiber aggregated body and heat-treating of the cut surface of the inorganic fiber aggregated body (forming of the melted portion) to be simultaneously performed using the laser, the inorganic fiber mat tends to be easily manufactured. By performing laser-cutting, the cut surface (from which fibers are likely to scatter away) is thoroughly heat-treated. Accordingly, fibers existing on the whole cut surface tend to surely be melted, and scattering of fibers tend to be reduced effectively.

In the above-mentioned inorganic fiber mat, preferably, a plurality of the inorganic fiber aggregated bodies are superimposed on one another and simultaneously cut by the laser.

In this case, the plurality of inorganic fiber aggregated bodies tend to be cut at one time, and cut surfaces thereof tend to be heat-treated. This further improves manufacturing efficiency. In addition, since non-contact laser cutting is employed, even when a plurality of inorganic fiber aggregated bodies are superimposed on one another and a thickness becomes larger, they tend to be cut into an accurate size.

In the above-mentioned inorganic fiber mat, a laser-irradiation treatment is preferably performed on at least a part of a surface of the inorganic fiber aggregated body other than a cut surface of the inorganic fiber aggregated body.

In this case, by heat-treating the surface, scattering of fibers away from the surface of the inorganic fiber aggregated body other than the cut surface tends to be reduced well. In addition, by heat-treating a face that is likely to be touched with a hand in handling the mat-shaped inorganic fiber aggregated body, a sense of irritation and a feeling of discomfort, which may arise in an operator during an assembling operation and the like, tend to be greatly reduced.

Examples of the laser used for cutting the inorganic fiber aggregated body and the like include a carbon dioxide gas laser, a YAG laser, an excimer laser, an He—Ne laser, a fiber laser, and a diode laser.

According to a third aspect in accordance with an embodiment of the present invention, there is provided a holding sealer including the inorganic fiber mat, which is disposed between an exhaust gas treatment unit and a casing of an exhaust gas purifying apparatus.

This tends to improve working conditions in assembling the holding sealer to a position between the exhaust gas treatment unit and the casing. In addition, since an amount of organic binder may be reduced more easily, increase in hardness of the holding sealer is more likely to be avoided, resulting in excellent workability in assembling. Further, a problem of odors generated when the organic binder burns at an initial use of the exhaust gas purifying apparatus, and the like, may be suppressed more easily.

According to a fourth aspect in accordance with an embodiment of the present invention, there is provided a sound absorber of a vehicle muffler including the inorganic fiber mat.

This tends to improve working conditions in assembling the vehicle muffler which is formed by assembling the sound absorber to another member. In addition, since an amount of organic binder may be reduced more easily, increase in hardness of the sound absorber is more likely to be avoided, resulting in excellent workability in assembling. Further, a problem of odors generated when the organic binder burns at an initial use of the vehicle muffler, and the like, may be suppressed more easily.

According to a fifth aspect in accordance with an embodiment of the present invention, there is provided a method for manufacturing an inorganic fiber mat, including: cutting an inorganic fiber aggregated body; and heat-treating at least a part of a surface of the inorganic fiber aggregated body.

In the fifth aspect, at least a part of the surface of the inorganic fiber mat is heat-treated, following which fibers existing on the surface are melted and fused to other fibers; therefore, the fibers are less likely to scatter. Thus, scattering of fibers away from the inorganic fiber mat tends to be effectively reduced. In addition, by heating the surface, end portions of fibers exposed on the surface are melted and changed into rounded shapes. Accordingly, a sense of irritation and a feeling of discomfort, which may arise when the surface is touched with a hand, may be reduced more easily. Moreover, since scattering of fibers tends to be reduced well without increasing an amount of organic binder, the inorganic fiber mat tends to be easily adapted to needs for a less amount of organic binder.

In the method for manufacturing an inorganic fiber mat, the inorganic fiber aggregated body is preferably laser-cut so that the cutting and the heat-treating are performed at one time.

In this case, since the cutting and the heat-treating tend to be simultaneously performed using the laser, the inorganic fiber mat tends to be easily manufactured. By performing laser-cutting, the cut surface (from which fibers are likely to scatter away) is thoroughly heat-treated. Accordingly, fibers existing on the whole cut surface are more likely to surely be melted, and scattering of fibers tends to be reduced effectively.

In the method for manufacturing an inorganic fiber mat, preferably, a plurality of the inorganic fiber aggregated bodies are superimposed on one another and simultaneously cut by the laser.

In this case, many inorganic fiber mats tend to be cut at one time, and cut surfaces thereof may be heat-treated more easily. This further improves manufacturing efficiency. In addition, since non-contact laser cutting is employed, even when a plurality of inorganic fiber aggregated bodies are superimposed on one another and a thickness becomes larger, they tend to be cut into an accurate size.

In the method for manufacturing an inorganic fiber mat, the heat-treating preferably includes performing a laser-irradiation treatment on at least a part of a surface of the inorganic fiber aggregated body other than a cut surface of the inorganic fiber aggregated body obtained in the cutting.

In this case, by heat-treating the surface, scattering of fibers away from the surface of the inorganic fiber aggregated body other than the cut surface tends to be reduced well. In addition, by heat-treating a face that is likely to be touched with a hand in handling the mat-shaped inorganic fiber aggregated body, a sense of irritation and a feeling of discomfort, which may arise in an operator during an assembling operation and the like, tend to be greatly reduced.

Examples of the laser used in the heat-treating include a carbon dioxide gas laser, a YAG laser, an excimer laser, an He—Ne laser, a fiber laser, and a diode laser.

Figure 2:
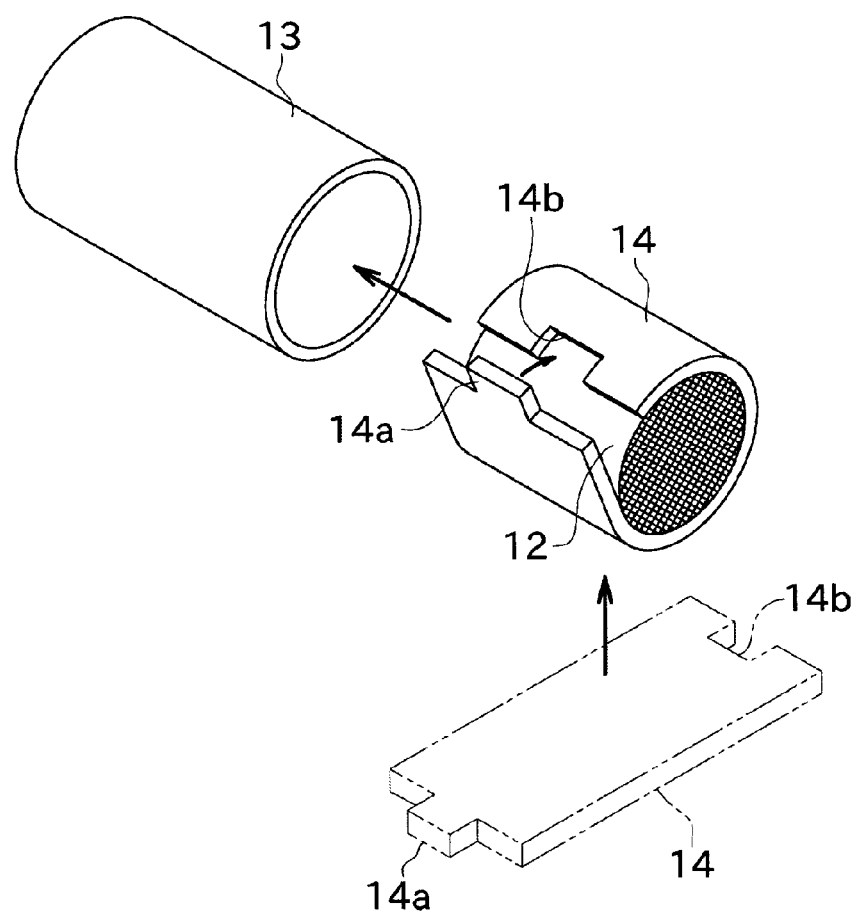
FIG. 2 is a perspective view for describing assembling of a catalyst supporting carrier to a shell of a catalyst converter.
Figure 3:
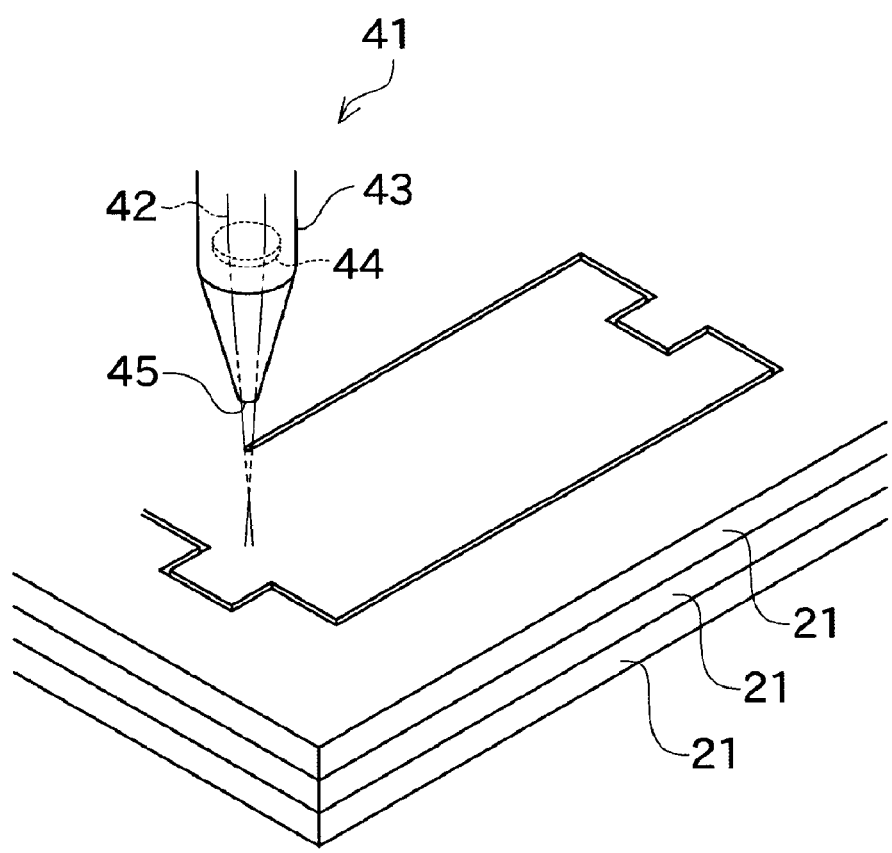
FIG. 3 is a perspective view schematically illustrating that an inorganic fiber aggregated body is being cut by a carbon dioxide gas laser.

Next, embodiments of the present invention will be described. FIG. 1 is a schematic sectional view of a catalyst converter including a holding sealer according to an embodiment of the present invention. FIG. 2 is a perspective view for describing assembling of a catalyst supporting carrier to a shell of a catalyst converter. FIG. 3 is a perspective view schematically illustrating that the holding sealer is being cut by a carbon dioxide gas laser.

As shown in FIG. 1, a catalyst converter (exhaust gas purifying apparatus) 11 of the present embodiment includes a catalyst supporting carrier (exhaust gas treatment unit) 12, a shell (casing) 13 that accommodates the catalyst supporting carrier 12, and a holding sealer 14 that is interposed between the catalyst supporting carrier 12 and the shell 13.

The catalyst supporting carrier 12 is formed into a round pillar shape, for example, and has a honeycomb structure with many cells formed therein. The catalyst supporting carrier 12 is made of ceramics such as silicon carbide, silicon nitride, cordierite, and mullite. Wall surfaces of the cells of the catalyst supporting carrier 12 are coated with a catalyst such as platinum, palladium, and rhodium, so that toxic substances contained in exhaust gases of a vehicle engine (internal combustion engine) 31 are detoxified when the exhaust gases pass through the cells of the catalyst supporting carrier 12.

As illustrated with broken lines in FIG. 2, the holding sealer 14 has a substantially rectangular shape, and a length (longitudinal length) of the holding sealer 14 is substantially equal to an outer circumference of the catalyst supporting carrier 12. A protrusion 14a is formed at one longitudinal end of the holding sealer 14, and a recess 14b is formed at the other longitudinal end of the holding sealer 14. A contour shape of the protrusion 14a and a contour shape of the recess 14b correspond to each other, so that the recess 14b and the protrusion 14a can be fitted with each other. The holding sealer 14 is made of an inorganic fiber mat obtained by cutting an inorganic fiber aggregated body into a predetermined shape.

As shown in FIG. 2, the shell 13 has a cylindrical shape with its both ends opened, and an inside diameter of the shell 13 is slightly larger than an outside diameter of the catalyst supporting carrier 12. In the present embodiment, the shell 13 is made of a metal material.

To assemble the catalyst converter 11 having the above-described structure, first, the holding sealer 14 is wound around an outer surface of the catalyst supporting carrier 12. At this time, the protrusion 14a of the holding sealer 14 is fitted to the recess 14b thereof, so that longitudinal end portions of the holding sealer 14 are connected to each other to thereby form the holding sealer 14 into an endless shape. Then, the catalyst supporting carrier 12 having the holding sealer 14 wound thereon is press-fitted into the shell 13 by use of elasticity of the holding sealer 14.

As shown in FIG. 1, exhaust pipe joints 15 and 16 are connected to the respective openings, formed at both ends of the shell 13, by welding, for example. One exhaust pipe joint 15 is connected, through an exhaust pipe 32 schematically illustrated with a broken line, to an exhaust port of the vehicle engine 31. The other exhaust pipe joint 16 is connected through an exhaust pipe 33 to a sound-reducing muffler not shown.

With this structure, exhaust gases discharged from the engine 31 are introduced into the shell 13 of the catalyst converter 11. In the shell 13, the catalyst supporting carrier 12 is held by resilience of the holding sealer 14. The exhaust gas is detoxified by passing through the catalyst supporting carrier 12.

Since a space between the outer surface of the catalyst supporting carrier 12 and the inner surface of the shell 13 is sealed with the holding sealer 14, the entire exhaust gases introduced into the shell 13 pass through the catalyst supporting carrier 12. Even when vibration or shock is applied to the shell 13 while a vehicle is running, for example, the elasticity of the holding sealer 14 serves to damp it, to thereby more easily prevent damage to the catalyst supporting carrier 12.

As shown in FIG. 3, the holding sealer 14 is obtained by cutting an inorganic fiber aggregated body 21 into a predetermined shape using a carbon dioxide gas laser processing machine 41, and irradiating faces (front surface and back surface) of the inorganic fiber aggregated body 21 other than its cut surface with a scanning laser of the carbon dioxide gas laser processing machine 41. Examples of the inorganic fiber aggregated body 21 include silica fibers, alumina fibers, alumina-silica-based fibers, and the like, which have been molded into a mat shape having a predetermined thickness. A possible thickness of the inorganic fiber aggregated body 21 is at least about 5 mm and at most about 20 mm, for example.

The inorganic fiber aggregated body 21 may be impregnated with an appropriate binder resin (e.g., an organic binder) for bonding fibers thereof. In addition, the inorganic fiber aggregated body 21 may undergo a known needling process for improving durability and strength thereof.

The carbon dioxide gas laser processing machine 41 shown in FIG. 3 generates a laser beam by a not-shown laser oscillator, and the laser beam 42 is transmitted to a beam condenser 43 through an optical path formed by a reflecting mirror or the like. A condenser lens 44 is disposed in the beam condenser 43. The laser beam 42 is converged by means of the condenser lens 44 and applied from a nozzle 45, to more easily melt and cut the inorganic fiber aggregated body 21, which serves as a workpiece. By applying the laser beam 42 with the nozzle 45 being spaced at a predetermined distance from the inorganic fiber aggregated body 21, a surface of the inorganic fiber aggregated body 21 tends to be heat-treated without the inorganic fiber aggregated body 21 being cut.

In the present embodiment, as shown in FIG. 3, a plurality of inorganic fiber aggregated bodies 21 that are superimposed on one another are set on the carbon dioxide gas laser processing machine 41, and cut into a shape of the holding sealer 14 shown in FIG. 2. In this way, a plurality of semi-finished products that have been cut into a predetermined shape and whose cut surface has been heat-treated may be obtained more easily at one time. Then, the inorganic fiber aggregated bodies 21 thus cut and heat-treated are set on the carbon dioxide gas laser processing machine 41 one by one, and a front surface and a back surface of the inorganic fiber aggregated body 21 are scanned with the laser beam 42 in a state where there is a sufficiently more space between the nozzle 45 and the inorganic fiber aggregated body 21 than in cutting. Thereby, faces of the inorganic fiber aggregated body 21 other than the cut surface (faces thereof facing in a thickness direction of the inorganic fiber mat) tend to be heat-treated with a laser. Surfaces (the cut surface, the front surface, and the back surface) of the inorganic fiber mat thus obtained exhibit a crystallization rate of about 80% or less.

On a side face (cut surface), a front surface, and a back surface of the holding sealer 14 which is made of the inorganic fiber mat obtained in the above-described manner, fibers are melt and fused to other fibers so that scattering of fibers may be suppressed more easily. This tends to improve working conditions in assembling the catalyst converter 11 as shown in FIG. 2. Moreover, there will be less fiber of the holding sealer 14 that has its end portion sharpened like a needle and exposed on the surface. Therefore, a sense of irritation and a feeling of discomfort, which may arise in an operator upon touching the holding sealer 14 during an assembling operation and the like, tend to be reduced.

Figure 4A:
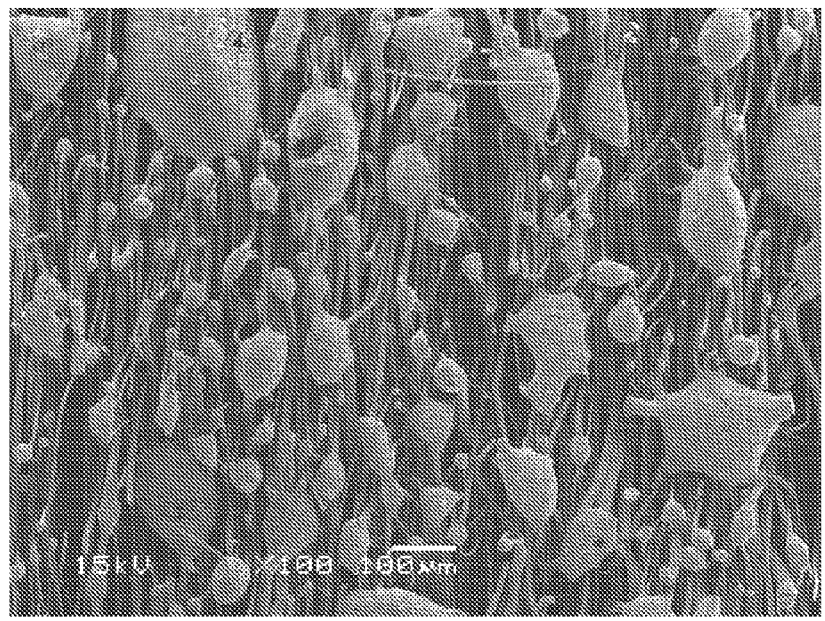
FIG. 4A is a scanning micrograph showing a cut surface of an inorganic fiber aggregated body cut by laser-cutting.
Figure 4B:
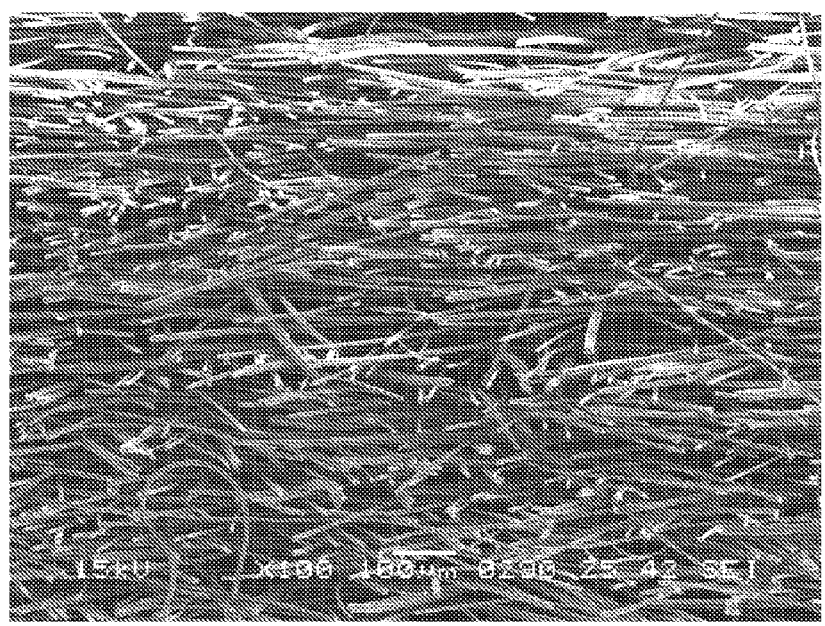
FIG. 4B is a scanning micrograph showing a cut surface of the inorganic fiber aggregated body cut by a punching blade.

FIG. 4A is a scanning micrograph showing a cut surface of an inorganic fiber aggregated body 21 cut by laser-cutting. FIG. 4B is a scanning micrograph showing a cut surface of the inorganic fiber aggregated body 21 cut by a punching blade.

When the inorganic fiber aggregated body 21 is cut by a punching blade, it is observed that many of thin fibers forming the mat are cut so that their end portions are exposed on the cut surface, as shown in FIG. 4B. The micrograph shown in FIG. 4B indicates that, in a case where the inorganic fiber aggregated body 21 is cut by a punching blade, fibers shortened by cutting are easily separated from a cut surface.

On the other hand, when the inorganic fiber aggregated body 21 is cut by laser-cutting, it is observed that many melted portions having various sizes, which are formed by melted fibers, appear over the entire region of the cut surface, as shown in FIG. 4A. A larger melted portion extends over a plurality of fibers and adheres. Many larger melted portions have flat, crushed shapes in a direction perpendicular to the cut surface. Through such larger melted portions, fibers exposed on the cut surface are observed to be fused to one another, to form a cross-linked structure. It is also observed that, on the cut surface, most of end portions of fibers are melted and changed into a rounded, a little swollen shape.

Next, fiber scattering property tests will be explained. Samples for the fiber scattering property tests were prepared using an inorganic fiber aggregated body manufactured by Mitsubishi Chemical Functional Products, Inc. (trade name: MAFTEC Blanket). The MAFTEC Blanket is a mat-molded inorganic fiber aggregated body containing 72% by weight of alumina and 28% by weight of silica. Its average fiber diameter is 5 μm, its organic component is 0%, a specific gravity of its surface is 1160 g/cm2, and its thickness is approximately 7.1 mm.

First, samples were prepared by cutting the above-mentioned inorganic fiber aggregated body by the carbon dioxide gas laser processing machine 41 as shown in FIG. 3. The carbon dioxide gas laser processing machine 41 used herein has a rated power output of 1 kW, a wavelength of 10.6 μm, a minimum condensed beam diameter of 100 μm, and a maximum processing speed of 30 m/min. In this experiment, a power output was set to 100 W, a wavelength was set to 10.6 μm, and a condensed beam diameter was set to 100 to 200 μm.

In this experiment, a laser output for cutting the inorganic fiber aggregated body 21 was variously changed to thereby prepare four samples (first to fourth samples). To be more specific, a laser output for cutting was 50 W for the first sample, 100 W for the second sample, 200 W for the third sample, and 300 W for the fourth sample. For any of the samples, a processing speed was 500 mm/min, and a distance between the inorganic fiber aggregated body 21 and the nozzle 45 for applying a laser beam was 1 mm.

Also, for comparative examples, a fifth sample was prepared by cutting the inorganic fiber aggregated body 21 by a punching blade, and a sixth sample was prepared by cutting the inorganic fiber aggregated body 21 by a punching blade and then sealing a cut surface thereof with an adhesive tape. Each of the first to sixth samples was cut into a square shape of 100 mm×100 mm.

Figure 5:
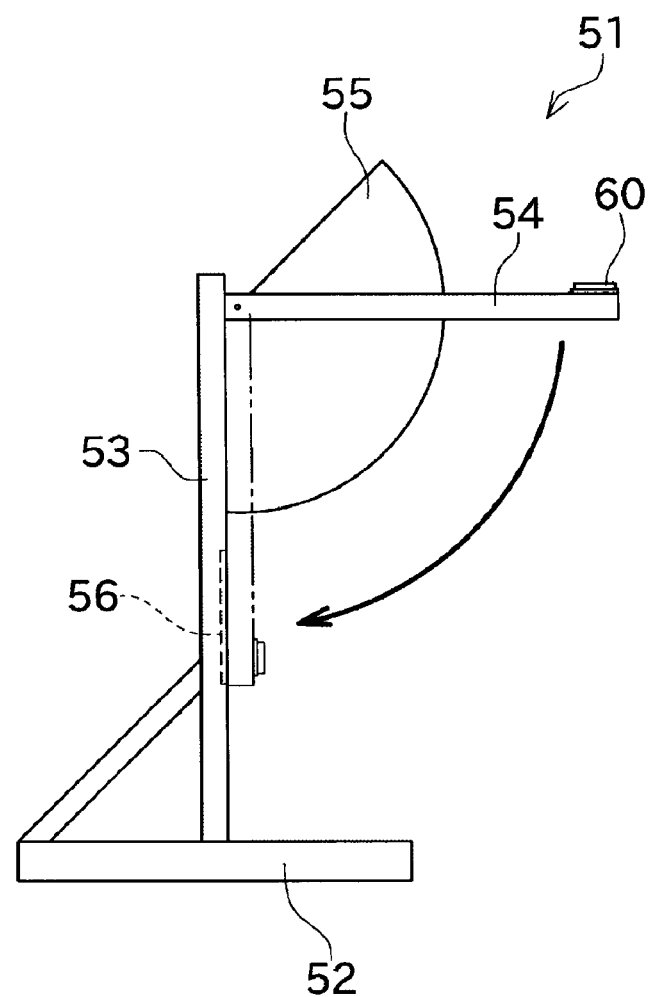
FIG. 5 is a side view of a test equipment used for fiber scattering property tests.

A fiber scattering property test was performed on each of the first to sixth samples using a test equipment shown in FIG. 5. The test equipment 51 has a support column 53 installed vertically on a base 52, and a sample support arm 54 rotatably pivoted at an upper end portion of the support column 53. A length of the sample support arm 54 is 92 cm. A scale plate 55 that indicates a lift angle of the sample support arm 54 is attached to the support column 53. A vertical wall member 56 is fixed at a position collidable with the sample support arm 54.

With such a structure, as shown in FIG. 5, the sample support arm 54 is brought into a horizontal position (with the lift angle of 90°), and locked by an appropriate locking mechanism. Then, the above-described sample 60 is fixed at a tip end portion (at an portion approximately 82 to 92 cm distant from a center of rotation) of the sample support arm 54, and locking by the locking mechanism is released. Thus, the sample support arm 54 rotates downward due to its own weight. At a time when the sample support arm 54 takes a vertical position as illustrated with broken lines, the sample support arm 54 collides with the vertical wall member 56 fixed to the support column 53. An amount of fibers scattering away from the sample 60 during the rotation and collision of the sample support arm 54 (fiber scattering amount) is calculated based on a change in weight of the sample 60 between before and after this operation.

Figure 6:
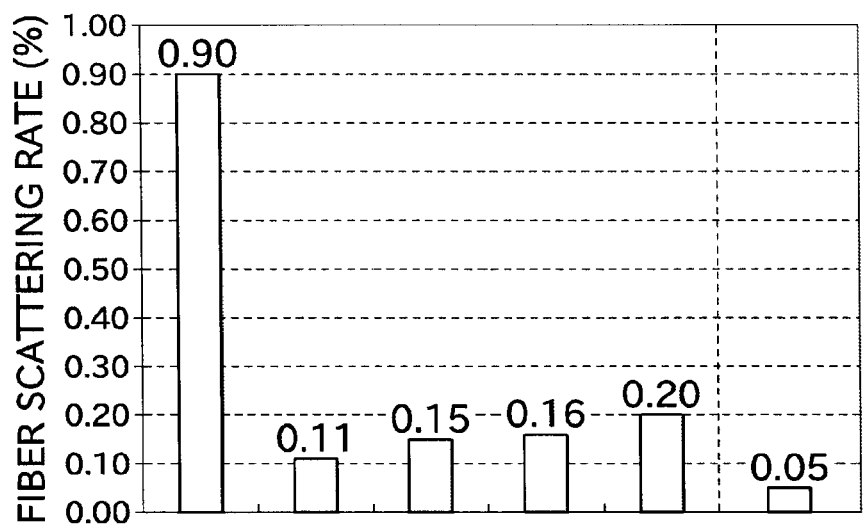
FIG. 6 is a graph showing results of fiber scattering property tests performed on samples that were laser-cut.

The above-described fiber scattering test was performed on each of the first to sixth samples, with a result as shown in a graph of FIG. 6. As shown in this graph, any of the first to fourth samples which were laser-cut are greatly improved in a fiber scattering rate, as compared with the fifth sample which was cut by the punching blade. Among the various outputs of the laser processing machine, the output of 50 W (for the first sample) was the best with respect the fiber scattering rate.

For each of the first to sixth samples, a mullite content of a cut surface was measured, to calculate a crystallization rate. For each of the first to fourth samples obtained by laser-cutting, diameters of the respective portions (melted portions) of a cut surface where fibers were melted and formed substantially spherical shapes were also measured, to calculate an average value.

The crystallization rate was calculated as follows. A portion of the cut surface of the inorganic fiber aggregated body was taken, powdered using a mortar, and underwent an X-ray diffraction analysis. In an X-ray diffractometer used in this diffraction, an X-ray source is a CuKα ray, and an X-ray output is 40 kV, 20 mA. The target diffraction lines were a diffraction line of mullite (16.4°) and a diffraction line of γ-Al2O3 (45.4°). A scanning angle range was 15.5° to 17° for mullite, and 43° to 49° for γ-Al2O3. A scanning speed was 0.2°/min, and sampling was performed every 0.01°. A divergence slit was 1.0°, a light receiving slit was 0.15 mm, a diffusion slit was 1.0°, and a monochromator slit was 0.6 mm.

Then, based on the result of the above-described X-ray diffraction, an integrated intensity IA of mullite and an integrated intensity IB of γ-Al2O3 were calculated. A range of integration for calculating the integrated intensities was 16.1 to 16.6° for mullite and 43.8° to 48.4° for γ-Al2O3. Each of the integrated intensities IA and IB was calculated by subtracting a count value of background white X-rays from an actual count value. Then, an integrated intensity ratio Y was obtained in accordance with an equation Y=IA/IB. The integrated intensity ratio Y thus obtained was multiplied by a coefficient c of a calibration curve equation, to thereby calculate a crystallization rate X (X=cY). For the inorganic fiber aggregated body used for these samples, the coefficient c was 1.60.

A diameter of the melted portion was measured in the following manner. Part of a laser-cut sample including a laser-cut surface was taken by being cut out with a cutter knife. This part was set on a scanning electron microscope, and a central portion of the laser-cut surface of the sample with respect to its thickness direction was photographed at a magnification of 100 times. For each of the portions where fibers were melted to form substantially spherical shapes as observed in a photograph, an average value between its maximum length and minimum length, which means an average diameter, was obtained and regarded as a diameter of this substantially spherical portion (melted portion). In this way, a diameter of every substantially spherical portion (melted portion) observed in the photograph was obtained, and an average of the diameters was regarded as an average diameter value of the melted portions.

FIG. 6 also shows crystallization rates and diameters of melted portions obtained in the above-described manner. This result shows that scattering of fibers tends to be reduced well by performing laser-cutting in such a manner as to obtain a crystallization rate of approximately 80% or less. The result also indicates that, in a case where a crystallization rate is at least about 30% and at most about 80%, a lower crystallization rate tends to leads to a lower fiber scattering rate.

Next, faces (front surface and back surface) of the inorganic fiber aggregated body other than its cut surface were heat-treated to thereby preparing four samples (seventh to tenth samples). A laser output for cutting and a processing speed for these four samples were identical to those for the first to fourth samples. In addition, for the seventh to tenth samples, the same inorganic fiber aggregated body as for the first to sixth samples was used, and a cut shape was a square shape of 100 mm×100 mm which was the same as for the first to sixth samples.

Further, the seventh to tenth samples were, on their faces (front surfaces and back surfaces) other than cut surfaces, irradiated with a laser of the laser processing machine. That is, a scanning laser was applied with the nozzle being spaced at a predetermined distance from a surface of the cut inorganic fiber aggregated body, so that the front surface and the back surface were entirely heat-treated. The inorganic fiber aggregated body (irradiated face) and the nozzle 45 applying the laser beam 42 were at a constant distance of 100 mm.

In this laser irradiation, a laser output was constant, 100 W, for any of the seventh to tenth samples. Meanwhile, a processing speed was adjusted in such a manner that a crystallization rate of the irradiated surface becomes approximately equal to the crystallization rate of the cut surface of corresponding one of the first to fourth samples. In the result, a processing speed was 2000 mm/min for the seventh sample, 1500 mm/min for the eighth sample, 1000 mm/min for the ninth sample, and 500 mm/min for the tenth sample.

Figure 7:
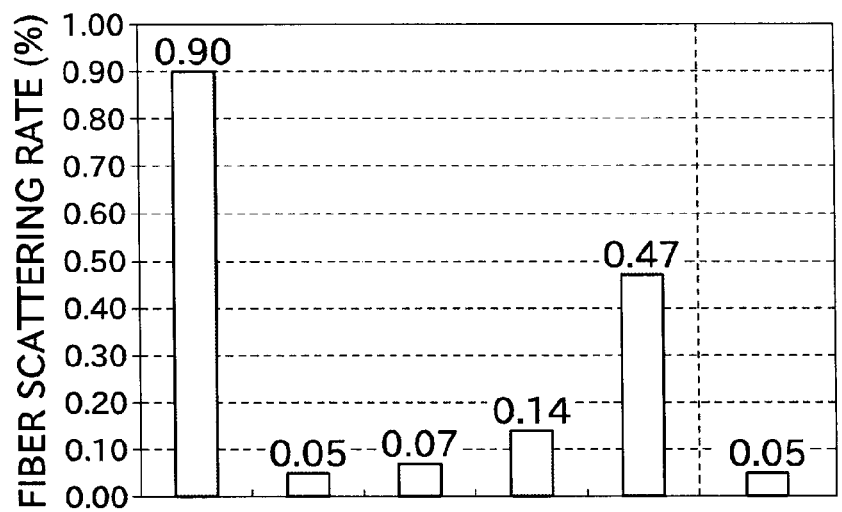
FIG. 7 is a graph showing results of fiber scattering property tests performed on samples that were laser-cut and then laser-irradiated on their front surfaces and back surfaces.

A fiber scattering property test was performed on each of the seventh to tenth samples using a test equipment shown in FIG. 5. A graph of FIG. 7 shows fiber scattering rates obtained by the fiber scattering property tests. The graph of FIG. 7 also shows results for the fifth and sixth samples in addition to the seventh to tenth samples.

For each of the seventh to tenth samples, as well as for the first to fourth samples, a crystallization rate of a laser-irradiated portion was calculated. Further, diameters of portions (melted portions) of the cut surface where fibers were melted to form substantially spherical shapes were also measured.

FIG. 7 also shows the crystallization rates and diameters of the melted portions. As shown in the measurement results, the crystallization rates of the seventh to tenth samples were substantially equal to the crystallization rates of the corresponding first to fourth samples (FIG. 6), approximately 80% or less. In addition, the diameters of the melted portions of the seventh to tenth samples were substantially equivalent to those of the corresponding first to fourth samples.

Figure 8:
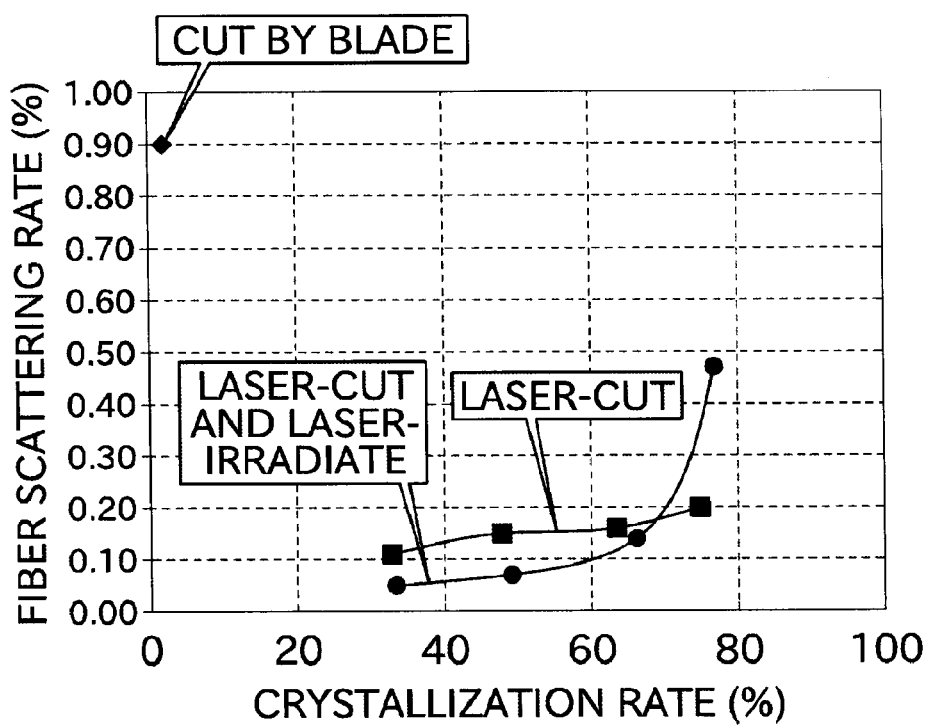
FIG. 8 is a graph showing a relationship between a crystallization rate and a fiber scattering rate of each of the samples used in the fiber scattering property tests.

As shown in the graph of FIG. 7, any of the seventh to tenth samples which were laser-cut and in addition laser-irradiated on its front surface and back surface are greatly improved in fiber scattering rates, as compared with the fifth sample which was cut by the punching blade. FIG. 8 shows a relationship between the crystallization rate and the fiber scattering rate of: the fifth sample which was cut by the punching blade; the first to fourth samples which were laser-cut; and the seventh to tenth samples which were laser-cut and laser-irradiated.

In the point of the laser irradiation on the faces other than the cut surface, the seventh to ninth samples are greatly improved in fiber scattering rates, as compared with the first to third samples which were laser-cut only. The tenth sample (having a crystallization rate of around 75%) is slightly deteriorated in fiber scattering rate as compared with the corresponding fourth sample, but nevertheless sufficiently improved in a fiber scattering rate as compared with the fifth sample which was cut by the punching blade.

Considering the above-described results together, it can be found that fiber scattering rates tend to be reduced well by performing a laser irradiation in such a manner that an irradiated portion exhibits a crystallization rate of about 80% or less and preferably about 70% or less.

The sixth sample as a reference example exhibits the good fiber scattering rate (0.05%) which is equal to the lowest fiber scattering rate of the seventh sample, although the sixth sample was cut by the punching blade. In a case where a cut surface is sealed with a tape as in the sixth sample, however, an amount of organic component increases only by the tape. An increase in organic component of the sixth sample shown in FIG. 7 caused by sealing the cut surface with the tape was calculated to be 4%. On the other hand, the first to fourth samples and the seventh to tenth samples tend to reduce the fiber scattering rate without such an increase in organic component, and therefore tend to meet needs for a less organic component.

As thus far described above, the inorganic fiber mat used as the holding sealer 14 of the present embodiment is formed by cutting the inorganic fiber aggregated body 21 and heat-treating inorganic fibers existing on the externally-exposed surfaces (the cut surface, the front surface, and the back surface) to fuse the inorganic fibers to one another.

By heat-treating the surface of the inorganic fiber mat, fibers existing on the surface are melted and fused to neighboring fibers as shown in FIG. 4A, with the result that the fibers do not easily scatter. Accordingly, scattering of fibers away from the inorganic fiber mat tends to be effectively reduced, to more easily improve working conditions in assembling the holding sealer 14 to the catalyst converter 11 as shown in FIG. 2. In addition, by heating the surface, end portions of the fibers are melted and changed into rounded shapes as shown in FIG. 4A, so that a sense of irritation and a feeling of discomfort, which may arise in an operator upon touching the surface, tend to be reduced.

Moreover, since scattering of fibers tends to be reduced well without increasing an amount of organic binder, a less amount of organic binder is needed. Therefore, since hardness of the inorganic fiber mat does not increase, winding the holding sealer 14 around the catalyst supporting carrier 12 as shown in FIG. 2 can be easily performed, so that workability in assembling the catalyst converter 11 is improved. In addition, since the amount of organic binder is not increased, there hardly occur: a problem of odors generated when the organic binder burns at an initial use of the catalyst converter 11; and a problem that the catalyst supporting carrier can no longer be maintained because repulsion force of the holding sealer 14 deteriorates after the organic binder burns to disappear.

In the inorganic fiber mat, the crystallization rate of the heat-treated surface is about 80% or less.

This tends to more favorably reduce scattering of fibers.

Further, the melted portions having rounded shapes are formed on the externally-exposed surface (e.g., the cut surface shown in FIG. 4A) of the inorganic fiber mat. Fibers exposed on the surface are cross-linked by the melted portion.

Since this enables fibers exposed to outside to be cross-linked by the melted portions, it may be easier to effectively prevent separation of the fibers from the surface, and consequently to favorably suppress scattering of fibers. This also tends to reduce a sense of irritation and a feeling of discomfort caused upon touching the surface of the inorganic fiber mat with a hand.

The inorganic fiber mat is manufactured by cutting the inorganic fiber aggregated body 21 with the carbon dioxide gas laser processing machine 41, as shown in FIG. 3.

Accordingly, cutting of the inorganic fiber aggregated body 21 and heat-treating of a cut surface of the inorganic fiber aggregated body 21 tend to be simultaneously performed using a laser. Thus, the inorganic fiber mat can be easily manufactured. In addition, since cutting is performed by heat-melting with a laser, the cut surface of the inorganic fiber aggregated body 21 is thoroughly heat-treated. Therefore, fibers existing on the whole cut surface tend to be surely melted, and scattering of fibers can more effectively be reduced.

As shown in FIG. 3, a plurality of inorganic fiber aggregated bodies 21 are superimposed on one another and simultaneously cut by a laser.

As a result, many inorganic fiber aggregated bodies 21 can be cut at one time, and cut surfaces thereof can be heat-treated. This improves manufacturing efficiency of the holding sealer 14. If a plurality of inorganic fiber aggregated bodies 21 superimposed on one another were cut by a punching blade, portions of the inorganic fiber aggregated bodies 21 brought into contact with the punching blade might easily deform in a crushed manner in a cutting operation, because of a large thickness of the inorganic fiber aggregated bodies 21. This may deteriorate dimensional accuracy of the inorganic fiber mat (holding sealer 14). In the present embodiment, however, since non-contact laser cutting is employed, even when a plurality of inorganic fiber aggregated bodies 21 are superimposed on one another, they tend to be cut into an accurate size.

The preferred embodiment of the present invention has been described above, and it may be changed more easily as follows, for example.

It is not always necessary to employ the carbon dioxide gas laser processing machine 41 for cutting the inorganic fiber aggregated body 21. For example, a laser processing machine using a YAG laser, an excimer laser, an He—Ne laser, a fiber laser, or a diode laser can be employed for cutting an inorganic fiber aggregated body 21. The various laser processing machines mentioned above can also be employed for laser-processing the front surface and the back surface of the inorganic fiber aggregated body 21.

FIG. 3 shows that three inorganic fiber aggregated bodies 21 superimposed on one another are being cut; and the number of inorganic fiber aggregated bodies 21 to be cut at one time may be one or two, or four or more. However, from the viewpoint of manufacturing efficiency, many inorganic fiber aggregated bodies 21 are preferably cut at one time.

Cutting the inorganic fiber aggregated body 21 is not limited to by a laser processing machine, and for example, cutting may be performed by the above-described punching blade. In such a case, an inorganic fiber mat exhibiting a small amount of fiber scattering is more likely to be obtained by, after cutting, heat-treating a cut surface up to a temperature not less than a melting temperature of the inorganic fiber (e.g., at least about 1800° C. and at most about 1850° C. for the inorganic fiber aggregated body 21 with an alumina-silica composition) using laser irradiation, a burner, or the like, for example. That is, although the cut surface of the inorganic fiber aggregated body on which fibers shortened by cutting exist exhibits a large amount of fiber scattering, the fiber scattering tends to be prevented effectively by the heating and melting treatment.

The application of the holding sealer 14 is not limited to holding the catalyst supporting carrier 12 of the catalyst converter 11 within the shell 13. For example, the holding sealer 14 may also be used for holding within a shell a DPF (diesel particulate filter) which captures particulate materials produced in a diesel engine.

Heat-treating may be performed not on the entirety of the externally-exposed surface of the inorganic fiber aggregated body but on a part of the surface. For example, laser irradiation on the faces of the inorganic fiber aggregated body other than the cut surface thereof may be omitted. In such a case as well, scattering of fibers tends to be prevented effectively by heat-treating a cut surface where separation of fibers is likely to occur.

It may be possible to perform laser irradiation on the front and back surfaces of the inorganic fiber aggregated body before laser-cutting the inorganic fiber aggregated body into a shape of the holding sealer.

The application of the inorganic fiber mat is not limited to as a holding sealer that holds the catalyst supporting carrier or the DPF. For example, the inorganic fiber mat may be used as a sound reducer employed in a muffler of a vehicle such as a four-wheeled vehicle, a two-wheeled vehicle, and the like. This may more easily provide good working conditions in assembling the sound reducer to a position between an inner muffler and an outer muffler of a muffler, and in addition reduce a feeling of discomfort and a sense of irritation caused when the mat is touched with a hand.

A thickness and a cut shape of the inorganic fiber aggregated body 21 may be appropriately changed in accordance with an application, a size, and the like, of a product in which the inorganic fiber aggregated body 21 is to be used.

Obviously, numerous modifications and variations of the present invention are possible in light of the above teachings. It is therefore to be understood that within the scope of the appended claims, the invention may be practiced otherwise than as specifically described herein.

The invention claimed is:

1. An inorganic fiber mat comprising:
   an inorganic fiber aggregated body comprising inorganic fibers, at least a part of the inorganic fibers located on a surface of the inorganic fiber aggregated body being fused to each other by heat,
   wherein a crystallization rate of the at least the part of the inorganic fibers is about 63.5% or less,
   wherein the inorganic fiber aggregated body is formed by cutting a piece of inorganic fiber aggregate using a laser, and
   wherein a laser output for cutting is about 200 W or less.

2. The inorganic fiber mat according to claim 1, wherein the inorganic fiber aggregated body is formed by simultaneously cutting a plurality of pieces of inorganic fiber aggregates which are superimposed on one another.

3. The inorganic fiber mat according to 1, wherein a laser-irradiation treatment is performed on the at least the part of the inorganic fibers other than a cut surface of the inorganic fiber aggregated body.

4. The inorganic fiber mat according to claim 1, wherein the laser is a carbon dioxide gas laser, a YAG laser, an excimer laser, an He—Ne laser, a fiber laser, or a diode laser.

5. An inorganic fiber mat comprising:
   an inorganic fiber aggregated body comprising:
      inorganic fibers;
      a rounded melted portion formed on at least a part of a surface of the inorganic fiber aggregated body; and
      at least a part of the inorganic fibers exposed on the surface being cross-linked by the melted portion,
   wherein a crystallization rate of the at least the part of the inorganic fibers is about 63.5% or less,
   wherein the inorganic fiber aggregated body is formed by cutting a piece of inorganic fiber aggregate using a laser, and
   wherein a laser output for cutting is about 200 W or less.

6. The inorganic fiber mat according to claim 5, wherein the inorganic fiber aggregated body is formed by simultaneously cutting a plurality of pieces of inorganic fiber aggregates which are superimposed on one another.

7. The inorganic fiber mat according to 5, wherein a laser-irradiation treatment is performed on the at least the part of the inorganic fibers other than a cut surface of the inorganic fiber aggregated body.

8. The inorganic fiber mat according to claim 5, wherein the laser is a carbon dioxide gas laser, a YAG laser, an excimer laser, an He—Ne laser, a fiber laser, or a diode laser.

9. A holding sealer comprising:
   the inorganic fiber mat according to claim 1, the inorganic fiber mat being configured to be disposed between an exhaust gas treatment unit and a casing of an exhaust gas purifying apparatus.

10. A sound absorber of a vehicle muffler comprising:
    the inorganic fiber mat according to claim 1.

11. A method for manufacturing an inorganic fiber mat, comprising:
    cutting an inorganic fiber aggregated body; and
    heat-treating at least a part of a surface of the inorganic fiber aggregated body,
    wherein the inorganic fiber aggregated body is laser-cut so that said cutting and said heat-treating are performed at one time,
    wherein a laser output for cutting is about 200 W or less, and
    wherein a crystallization rate of the at least the part of the inorganic fibers is about 63.5% or less.

12. The method for manufacturing an inorganic fiber mat according to claim 11, wherein the inorganic fiber aggregated body is formed by simultaneously cutting a plurality of pieces of inorganic fiber aggregates which are superimposed on one another.

13. The method for manufacturing an inorganic fiber mat according to claim 11, wherein said heat-treating includes performing a laser-irradiation treatment on at least the part of the surface of the inorganic fiber aggregated body other than a cut surface of the inorganic fiber aggregated body obtained in said cutting.

14. The method for manufacturing an inorganic fiber mat according to claim 11, wherein said laser is a carbon dioxide gas laser, a YAG laser, an excimer laser, an He—Ne laser, a fiber laser, or a diode laser.

* * * * *